F. W. DANBERG.
ARTICLE SETTING UP MEANS.
APPLICATION FILED JAN. 17, 1921.
1,425,319. Patented Aug. 8, 1922.
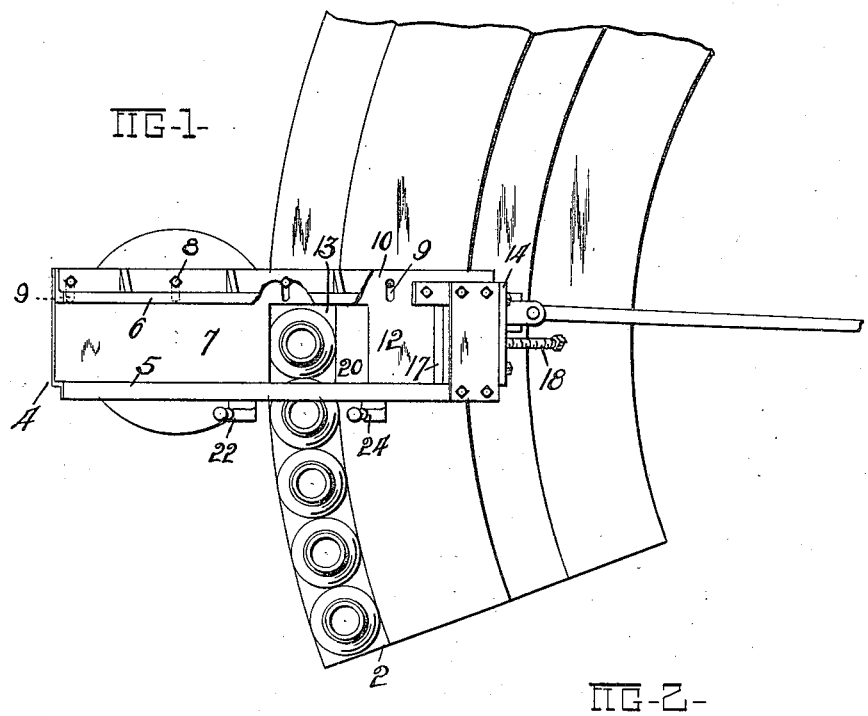
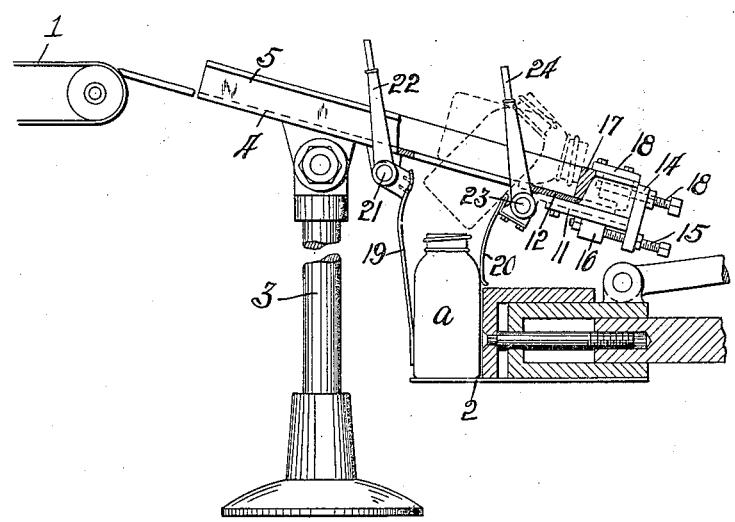
INVENTOR
Fred W. Danberg,
By Owen Owen & Crampton,
His attys.

UNITED STATES PATENT OFFICE.

FRED W. DANBERG, OF TOLEDO, OHIO.

ARTICLE SETTING-UP MEANS.

1,425,319.  Specification of Letters Patent.  Patented Aug. 8, 1922.

Original application filed December 22, 1919, Serial No. 346,737. Divided and this application filed January 17, 1921. Serial No. 437,699.

*To all whom it may concern:*

Be it known that I, FRED W. DANBERG, a citizen of the United States, and a resident of Toledo, in the county of Lucas and State of Ohio, have made an invention appertaining to Article Setting-Up Means; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to article delivery and righting means, and has for its object the provision of simple and efficient means of this class for setting up and delivering bottles, jars or the like, in upright position to a receiving or carrying away means in a rapid and accurate manner, such delivery means being adjustable to adapt it to handle articles of different shapes and sizes.

The invention is fully described in the following specification, and while, in its broader aspect, it is capable of embodiments in numerous forms, a preferred embodiment thereof is illustrated in the accompanying drawings, in which,—

Figure 1 is a top plan view of an apparatus embodying the invention with parts broken away and in association with a carrying away means fragmentarily shown, and Fig. 2 is a side elevation thereof with parts broken away and in operative relation to a supply means, fragmentarily shown, and to a carrying away means shown in fragmentary section.

This application is filed as a division of my copending application Serial No. 246,737, filed December 22, 1919, for an article delivery mechanism.

In the manufacture of blown or molded glassware, such for instance as bottles, jars, or the like, particularly when made by automatic machinery, the articles are usually delivered to a conveyor belt or carrying-away means in reclining position and it is desirable in transferring these articles to a lehr to deliver them thereto in upright position. It is therefore necessary to right the articles intermediate the carrying-away means and either the lehr or the feeding-in means therefor, and it is in this article righting means that the present invention resides.

Referring to the drawings, 1 designates a conveyor belt or means for carrying articles in reclining position away from a source of supply, and 2 any suitable movable means to which the articles may be delivered from the conveyor means 1 in upright position by the setting-up mechanism embodying the present invention. The means 2, in the present instance, comprises the means for feeding articles into a lehr, which means constitutes the subject matter of my said copending application.

The setting-up mechanism embodying the present invention comprises in its present embodiment a standard 3, which is preferably adjustable as to height and carries a longitudinally inclined trough member 4 at its upper end, preferably for tilting adjustment to obtain the desired inclination of the member, and which is intended to direct an article *a* from the delivery end of the conveyor means 1 to a point over the receiving means 2. The trough member 4 has at one side a fixed side wall 5 and at its other side a movable side wall 6, which latter is mounted on the bottom 7 of the trough for adjustment transversely thereof to vary the width of the trough to suit the size of the articles to be acted on. The adjustable side 6 is secured to the trough bottom by bolts or screws 8 extending through the outwardly extending base flange of the side and through registering transverse slots 9 in the trough bottom. The integral side 5 and an integral extension 10 on the opposite side edge of the bottom 7 extend a distance in advance of said bottom and form guides 11 between which a movable forward bottom section 12 is mounted for longitudinal adjusting movements, the bottom sections 7 and 12 forming an opening or jump-gap 13 therebetween, the size of which is regulated by relative adjustment of such sections.

The adjustable side wall 6 of the trough extends forward beyond the opening 13 and for a distance along the adjacent side of the movable bottom section 12. A stationary end member 14 is provided at the forward end of the trough, being fixed to the side 5 and bottom extension 10. This end member has a screw 15 threaded through its lower portion and swiveled at its rear or inner end in a lug 16 on the bottom of the bottom section 12, whereby an adjustment of such section may be effected by a turning of the screw. A bumper block 17, which may be of wood, is mounted over the forward end of the bottom section 12 and is longitudinally adjustable relative thereto by the turning of a screw 18, which is threaded through the upper portion of the end member 14 and swiveled at its inner end in the block. A plate 18 is mounted over the bumper-block 17 to hold it to its seat in the trough, said plate being screwed or otherwise suitably fixed to the side 5 and extension 10.

Guide wings 19 and 20, preferably of a yielding or flexible nature, extend downward respectively from the rear and forward edges of the trough opening 13 and are preferably mounted for swinging adjustment toward and away from each other to adapt them to be regulated to suit the size and style of the article to be set up. For this purpose the rear wing 19 has its upper end fixed to a shaft 21 journaled in a lug or boss in the bottom of a forward end portion of the bottom section 7, and a control handle 22 projects from this shaft to facilitate a rocking adjustment of the guide wing. The forward guide 20 is carried in a similar manner by a shaft 23 journaled in the under side of the bottom section 12 adjacent to its rear end and having a handle 24 projecting therefrom to facilitate adjustment.

An article, upon being delivered to the trough 4, slides down the same, being held in lengthwise relation thereto by the sides of the trough, which have suitable relative adjustment for such purpose, the speed of travel of the article down the trough being sufficient to carry it across the gap or opening 13 and into contact at its forward end with the bumper-block 17. The adjustment of the bumper-block may be such that the article, when brought to a stop thereby, will have its center of gravity disposed slightly to the rear of the rear edge of the front bottom section 12 of the trough so that the article will be overbalanced by the weight of its rear end portion and caused to fall rearward and downward in upright position through the opening 13 and between the guide wings 19 and 20, which latter direct the article to proper setting-up position on the subjacent supporting means 2. The speed of movement of the subjacent support should be sufficient to advance the article a distance slightly greater than its width by the time the next article has been fed to toppling-over position in the delivery trough. It is evident that the length of the gap 13 in the trough is determined by the length of the article operated on and may be varied by an adjustment of the bottom section 12 to suit the particular case. It is also evident that the inclination of the trough 4 is adjusted to suit the speed at which it is desired to feed an article down the same in order that it may effectually jump the gap 13, and that the slight rebound which is given the article as it strikes the bumper-block 17 assists in toppling it rearwardly down through the opening 13.

I wish it understood that my invention is not limited to any specific construction. arrangement, or form of the parts, as it is capable of numerous modifications and changes, without departing from the spirit of the claims.

Having thus described my invention, what I claim as new, and desire to secure by Letters Patent, is,—

1. In an article setting-up means, an inclined trough-like member having an opening intermediate its ends over which an article jumps in sliding down the incline, and a bumper disposed at the forward end of the member in position to stop the forward movement of an article with the center of gravity of the article disposed at the rear of the forward side of said opening whereby the article may be topple by gravity rearwardly down through the opening and be delivered in upright position to a subjacent surface.

2. In an article setting-up means, an inclined member having a jump-gap intermediate its ends, the member being adjustable to vary the size of the gap, and a bumper in advance of the gap in position to stop the forward movement of an article down the incline with the center of gravity of the article disposed at the rear of the forward edge of the gap whereby the article is caused to topple rearwardly by gravity down through the gap and be delivered to a subjacent surface in upright position.

3. In an article setting-up means, an inclined trough having an opening intermediate its ends and a bumper in advance of said opening adjustable longitudinally of the trough and positioned to stop an article in its descent down the trough with its center of gravity at the rear of said opening, the opening being of a size to permit the article to topple rearwardly and downwardly therethrough.

4. In an article setting-up means, an inclined trough having an opening in its bottom intermediate its ends, a bumper in advance of said opening to stop an article in position for its center of gravity to be disposed at the rear of the forward edge of said opening to permit the article to topple rearwardly and downwardly through the opening, the opening being of suitable size for such purpose, and means for guiding the downward movement of the article through and from the opening.

5. In an article setting-up means, an inclined trough having an opening in its bottom intermediate its ends, a bumper in advance of said opening to stop an article in position for its center of gravity to be disposed at the rear of the forward edge of said opening to permit the article to topple rearwardly and downwardly through the opening. the opening being of suitable size for such purpose, and adjustable means for guiding the downward movement of the article through and from the opening.

6. In an article setting-up means, an inclined trough having an opening intermediate its ends and a bumper at the forward end of the trough in position to stop an article with its rear end over said opening to permit a rearward and downward falling of the article through the opening in upright position, and yielding adjustable means for directing the downward falling movement of the article.

7. In an article setting up means, an inclined trough adjustable as to width and inclination and having an opening intermediate its ends, and a bumper at the forward end of the trough in position to stop an article with its rear end over the opening to permit rearward and downward falling of the article through the opening in upright position.

In testimony whereof, I have hereunto signed my name to this specification.

FRED W. DANBERG.